United States Patent
Kolbe et al.

(10) Patent No.: US 9,084,234 B2
(45) Date of Patent: Jul. 14, 2015

(54) METHOD AND BASE STATION FOR SUPPORTING A CONNECTION BETWEEN A COMMUNICATION DEVICE AND A DESTINATION DEVICE IN A TARGET NETWORK

(75) Inventors: Hans-Joerg Kolbe, Darmstadt (DE); Andreas Kunz, Heddesheim (DE)

(73) Assignee: NEC EUROPE LTD., Heidelberg (DE)

( * ) Notice: Subject to any disclaimer, the term of this patent is extended or adjusted under 35 U.S.C. 154(b) by 137 days.

(21) Appl. No.: 13/882,291

(22) PCT Filed: Nov. 29, 2010

(86) PCT No.: PCT/EP2010/007220
§ 371 (c)(1),
(2), (4) Date: Apr. 29, 2013

(87) PCT Pub. No.: WO2012/072091
PCT Pub. Date: Jun. 7, 2012

(65) Prior Publication Data
US 2013/0215864 A1    Aug. 22, 2013

(51) Int. Cl.
*H04W 80/04* (2009.01)
*H04W 88/06* (2009.01)
(Continued)

(52) U.S. Cl.
CPC ......... *H04W 76/022* (2013.01); *H04L 12/4633* (2013.01); *H04L 45/26* (2013.01); *H04L 45/566* (2013.01); *H04L 63/164* (2013.01)

(58) Field of Classification Search
CPC ..... H04W 80/04; H04W 88/06; H04W 28/04; H04W 72/04
USPC ................................. 370/328, 329
See application file for complete search history.

(56) References Cited

U.S. PATENT DOCUMENTS

| 7,574,738 | B2 | 8/2009 | Daude et al. |
| 8,107,471 | B2 | 1/2012 | Nakamura et al. |

(Continued)

FOREIGN PATENT DOCUMENTS

| EP | 1 418 730 | 5/2004 |
| JP | 2008311974 A | 12/2008 |

(Continued)

OTHER PUBLICATIONS

3GPP TSG SA WG2 Meeting #71, TD S2-090902, "Enhanced Security Support for S2c", Qualcomm Europe, 2009, pp. 2-7.
(Continued)

*Primary Examiner* — Ronald B Abelson
(74) *Attorney, Agent, or Firm* — Young & Thompson (57) ABSTRACT

A method for supporting a connection between a communication device and a destination device in a target network over intermediate network nodes, in particular in the context of Internet Protocol based communication, wherein data between the communication device and the destination device is transmitted via a tunnel established between the communication device or a base station connected to the communication device, as a first tunnel endpoint and a gateway in the target network as a second tunnel endpoint. One or more dummy packets are sent via the tunnel from the first tunnel endpoint towards the second tunnel endpoint, information is encoded in the packet headers of the one or more dummy packets, and at least one of the intermediate network nodes, upon receiving the one or more dummy packets, performs the steps of detecting and/or decoding the encoded information and performing a predefined action dependent on the encoded information.

19 Claims, 6 Drawing Sheets

(51) Int. Cl.
*H04W 28/04* (2009.01)
*H04W 72/04* (2009.01)
*H04W 76/02* (2009.01)
*H04L 12/46* (2006.01)
*H04L 12/721* (2013.01)
*H04L 29/06* (2006.01)

(56) References Cited

U.S. PATENT DOCUMENTS

2002/0191607 A1  12/2002  Galand et al.
2005/0025151 A1   2/2005  Marce et al.
2009/0228697 A1*  9/2009  Kurashige ............... 713/100

FOREIGN PATENT DOCUMENTS

JP       2009206769 A    9/2009
WO       2009149111 A2   12/2009
WO       WO 2010074159 * 7/2010 ............ H04W 48/20

OTHER PUBLICATIONS

International Search Report dated Aug. 4, 2011, corresponding to PCT/EP2010/007220.
Sohail Munir; "Active Networks—A Survey"; Aug. 14, 1997; XP002652513.
Rosen Cisco Systems E. et al.; Multiprotocol Label Switching Archieecture; Jan. 1, 2001; XP015008814; p. 33.
P. Bertin, et al.; Distributed or Centralized Mobility?; Global Telecommunications Conference; 2009; Nov. 30, 2009; pp. 1-6; XP031646464.
Yoo Kuen-Chool, et al; "Novel Signaling Scheme for 1X CDMA-Based Femtocell Networiks"; Feb. 7, 2010; pp. 639-642.

* cited by examiner

| Bit 1 | Bit 2 | Bit 3 | Bit 4 | Bit 5 | Bit 6 | Bit 7 | Bit 8 | Bit 9 | Bit 10 | Bit 11 | Bit 12 | Bit 13 | Bit 14 | Bit 15 | Bit 16 |
|---|---|---|---|---|---|---|---|---|---|---|---|---|---|---|---|
| 0 | 0 | 0 | 1 | 0 | 0 | 1 | 1 | 0 | 1 | 0 | 0 | 0 | 0 | 0 | 0 |

Fig. 6

METHOD AND BASE STATION FOR SUPPORTING A CONNECTION BETWEEN A COMMUNICATION DEVICE AND A DESTINATION DEVICE IN A TARGET NETWORK

The present invention relates to a method for supporting a connection between a communication device and a destination device in a target network over intermediate network nodes, in particular in the context of Internet Protocol (IP) based communication, wherein data between said communication device and said destination device is transmitted via a tunnel, wherein said tunnel is established between said communication device or a base station, to which said communication device is connected, as a first tunnel endpoint and a gateway in said target network as a second tunnel endpoint.

Furthermore, the present invention relates to a base station, in particular a femtocell, for supporting a connection between a connected communication device and a destination device in a target network over intermediate network nodes, as a first tunnel endpoint being configured to establish a tunnel with a gateway in said target network as a second tunnel endpoint for transmitting data between said communication device and said destination device.

BACKGROUND OF THE INVENTION

In the context of Internet Protocol (IP) based communication, methods and devices of the initially described type are known from the practice for years. Specifically, both femtocells in 3GPP ($3^{rd}$ Generation Partnership Project) and mobile handsets via non-3GPP access use in most deployment cases IPSec (Internet Protocol Security) tunnels when having to connect via an untrusted network towards the 3GPP core network. This results in an end-to-end encryption from the viewpoint of the intermediate network.

In case of using IPSec, the transmitted packets can be encrypted and thus not readable to any intermediate network node in the data path. Due to this, it is a challenging to control or influence the intermediate network nodes to that effect that a connection, in particular a data flow, between a communication device and a destination device in a target network over intermediate network nodes is enhanced, for example concerning network performances, Quality of Service (QoS) or other purposes such as charging. Referring to this, existing solutions require inefficient and complex dedicated signalling procedures or connections for QoS signalling or charging matters.

It is therefore an object of the present invention to improve and further develop a method of the initially described type for supporting a connection between a communication device and a destination device in a target network over intermediate nodes in such a way that, by employing mechanisms that are readily to implement, the intermediate network nodes can be influenced in an efficient way. Furthermore, a corresponding communication device, network node and base station is to be specified.

SUMMARY OF THE INVENTION

In accordance with the invention, the aforementioned object is accomplished by a method comprising the features of claim 1. According to this claim, such a method is characterized in that one or more dummy packets are sent via said tunnel from said first tunnel endpoint towards said second tunnel endpoint, wherein information is encoded in the packet headers of said one or more dummy packets, and wherein at least one of said intermediate network nodes, upon receiving said one or more dummy packets, performs the steps of detecting and/or decoding said encoded information and performing a predefined action dependent on said encoded information.

Furthermore, the aforementioned object is accomplished by a communication device comprising the features of claim 14. According to this claim, such a communication device is configured to execute a method according to the present invention.

Furthermore, the aforementioned object is accomplished by a network node comprising the features of claim 15. According to this claim, such a network node functions as intermediate network node and is configured to execute a method according to the present invention.

Finally, the aforementioned object is accomplished by a base station comprising the features of claim 16. According to this claim, such a base station is characterized in that said base station is further configured to send one or more dummy packets via said tunnel towards said gateway, wherein information is encoded in the packet headers of said one or more dummy packets, and wherein said information triggers a predefined action that is performed by at least one intermediate network node between said tunnel endpoints that receives said one or more dummy packets.

According to the invention it has first been recognized that although the payload of packets transmitted via a tunnel are generally encrypted, but the header fields of these packets are readable by intermediate network nodes and this fact can be used in a favourable way to influence intermediate network nodes. Specifically, it has been recognized that these header fields can be employed in order to convey predefined information to intermediate network nodes. To achieve this, one or more dummy packets, i.e. dedicated packets, are sent via the tunnel from the first tunnel endpoint towards the second tunnel endpoint, wherein information is encoded in the packet headers of the one or more dummy packets. At least one of the intermediate network nodes, upon receiving the dummy packet, performs the detection and/or decoding of the encoded information. Dependent on the encoded information of one or more dummy packets, the at least one intermediate network node performs a predefined action. Thus, the method according to the present invention and the corresponding communication device, network node and base station enable to get influence on intermediate network nodes in an efficient way. Consequently, the intermediate network nodes are enabled to read the encoded information and perform an action without requiring a separate control channel.

According to a preferred embodiment a packet header field or a combination of packet header fields of the dummy packets may be employed in order to carry the information. As already mentioned before, in case of using a tunnel, the payload of transmitted packets is generally encrypted and thus not readable to any intermediate network node in the data path. However, fields being readable are the header fields of e.g. TCP (Transmission Control Protocol), UDP (User Datagram Protocol) or IP (Internet Protocol) such as the following: Version, IHL (IP Header Length), Differentiated Services, Total length, Identification, Flags, Fragment offset, TTL (Time to Live), Protocol, Header checksum, Source IP address or Destination address. Thus, information for intermediate network nodes may be encoded in the header fields by creating appropriate dummy packets. By doing this, it should be noted that only these fields whose content or value are not obligatory for a correct functionality of the packet such as the destination IP address field can be employed. Correct functionality in this context means that the packet reaches its destination node.

Advantageously, the information may be encoded in a length field of the packet headers of the dummy packets. The value of the length field of a packet is not obligatory for reaching the destination node of the packet and thus this field can be smoothly employed to place information in the packet. Solely, it is noted that the packet header is to be kept valid by generating a packet of a size that corresponds to the used value of the length field. Depending on the used IP version, the total length field may be employed in relation to IPv4 and the payload length field may be employed in relation to IPv6.

According to a preferred embodiment the information may be encoded in the TTL (Time to Live) field or the Hop Limit field of the packet headers, wherein the TTL field is employed in relation to IPv4 and the Hop Limit field in relation to IPv6. Advantageously, the TTL field or the Hop Limit field may be employed in combination with the length field. For example, the TTL field or the Hop Limit field may be employed for enabling the intermediate network nodes to correlate packets when intermediate packets having other TTL values are sent.

According to a preferred embodiment the information encoded in the packet headers include a network policy and/or a command that triggers a predefined action. Thus, commands being defined inline may be conveyed to one or more intermediate network nodes in order to influence or control them. For example, commands may be defined for session modification or teardown. Furthermore, any other commands are possible that an intermediate network node might have to execute and/or that are required for installing a policy. E.g. an intermediate network node may implement charging procedures. Advantageously, it may be allowed to encode multiple commands in a single dummy packet and/or in a dummy packet chain, wherein the commands do not have to be related to each other. For instance, a QoS policy command and an accounting command in one packet chain.

According to a preferred embodiment the information encoded in the packet headers may include predefined matching criteria in order to be detected and/or decoded by the intermediate network nodes. The matching criteria can trigger the detection of the dummy packet in the intermediate network node. For example, the employment of a very rare packet length for the dummy packet may be expedient matching criteria. Thus, the dummy packets with included matching criteria may be employed to trigger a predefined action or to signal to the intermediate network node that a command is following.

With respect to reducing error-proneness it may be provided that the matching criteria include a predefined sequence of dummy packets. In doing so, more or less dummy packets may be employed for enabling a predetermined pattern matching. Specifically, any kind of a training sequence including at least two dummy packets may be defined in order to trigger the detection in an intermediate network node. Thus, the training sequence may be used to reduce the probability that normal packets potentially trigger the intermediate network nodes to execute not wanted commands. This training sequence or pattern has to be well-defined and previously known to the intermediate network node or to all intermediate network nodes that have to handle the information encoded in the dummy packets. Therefore, pre-agreed sequences should be previously distributed to the corresponding intermediate network nodes.

With respect to security it may be provided that the matching criteria is defined as one-time matching criteria that are walked through with each packet or session in order to prevent that packet snooping gives access to network node functions. For instance, a list of different training sequences may be distributed to the intermediate network nodes.

Advantageously, the matching criteria may be previously distributed to the intermediate network nodes that should be destined to handle the information encoded in the corresponding dummy packet.

According to a preferred embodiment the packet headers, in which the information is encoded, may be outer Internet Protocol (IP) headers of a protocol over Internet Protocol (IP) tunnelling, in particular Internet Protocol Security (IPSec), Generic Routing Encapsulation (GRE), Layer 2 Tunnelling Protocol (L2TP) or GPRS Tunnelling Protocol (GTP).

According to a preferred embodiment the dummy packets may be sent via the second tunnel endpoint to the destination device, wherein payload is included in the dummy packets that are extracted by the destination device.

According to a preferred embodiment the dummy packets may be sent via the second tunnel endpoint to the destination device, wherein the destination device, e.g. a target host, performs an action that is based on the dummy packets upon receiving them. The destination device may perform actions such as accounting, informing a policy control subsystem, etc. based on the dummy packets received, in particular with or without meaningful payload. It may be possible that additional information for the destination device is encoded in the payload of the packet.

According to a preferred embodiment a bidirectional communication may be provided, wherein the destination device, upon receiving a dummy packet, sends a reply packet to the first tunnel endpoint. For instance, the reply packet may include the confirmation of reception of a sequence of dummy packets.

Furthermore, it is mentioned that the method according to the present invention does not need to modify headers of regular packets needed for the communication between a communication device or base station and a gateway in the target network. Instead the communication device or base station creates according to a specific rule dummy packets and sends them to a specific destination device, e.g. a specific host, in the target network via a tunnel where the header fields can be populated as needed to match the matching criteria. Moreover, the second endpoint or the destination device in the target network may also be allowed to create dummy packets and thus in reverse direction.

BRIEF DESCRIPTION OF THE DRAWINGS

There are several ways how to design and further develop the teaching of the present invention in an advantageous way. To this end it is to be referred to the patent claims subordinate to patent claim 1 on the one hand and to the following explanation of preferred embodiments of the invention by way of example, illustrated by the figure on the other hand. In connection with the explanation of the preferred embodiments of the invention by the aid of the figure, generally preferred embodiments and further developments of the teaching will we explained. In the drawing

DETAILED DESCRIPTION OF THE PREFERRED EMBODIMENTS

Figure 1:
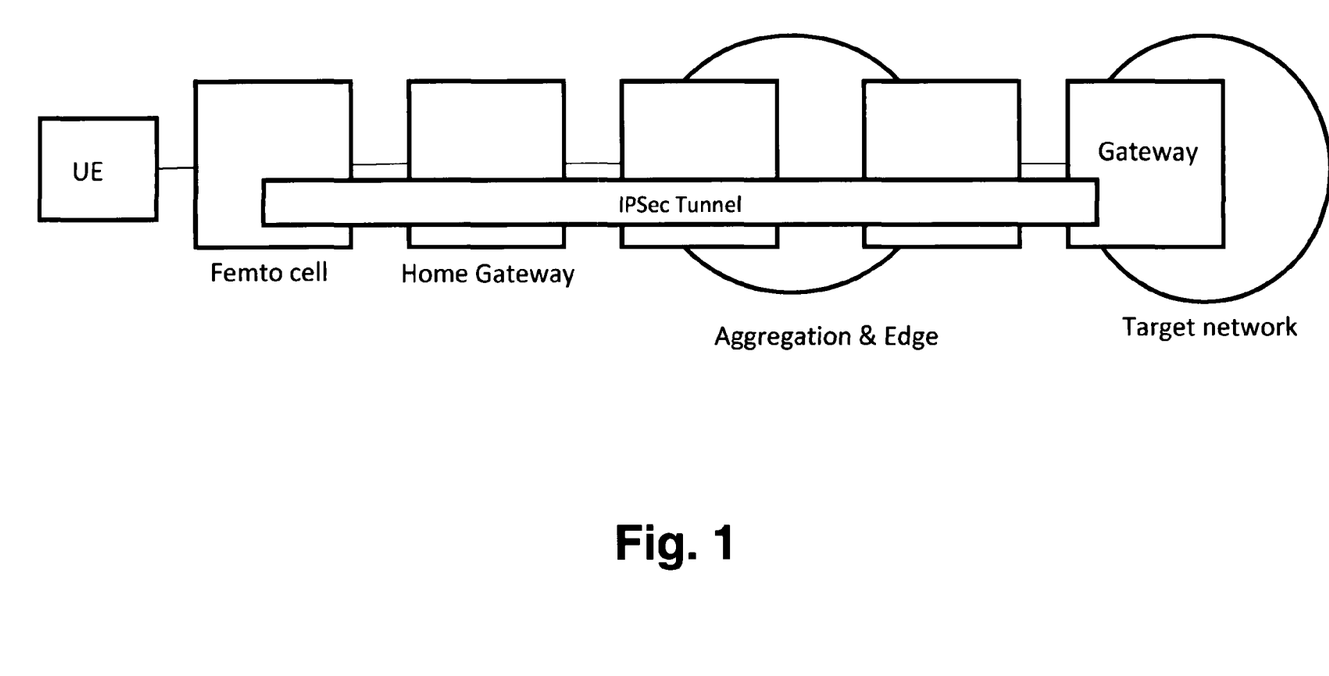
FIG. 1 is a schematic illustration of an application scenario of a method according to the present invention in the context of 3GPP access.

FIG. 1 shows an application scenario of a method according to the present invention in the context of 3GPP access. In 3GPP, femtocells—also being designated as Home NodeBs—use in most deployment cases IPSec tunnels as shown in FIG. 1 when having to connect via an untrusted network towards the 3GPP core network. This results in an end-to-end encryption from the viewpoint of an intermediate network. FIG. 1 shows the case when the femtocell is connected to the gateway in the target network with an IPSec tunnel. The communication device UE—also being designated as user equipment—is connected to the femtocell. The Home Gateway illustrated in FIG. 1 is separated from the femtocell and is therefore part of the untrusted intermediate network together with the Aggregation and Edge network nodes. The intermediate network nodes of the intermediate network can identify commands that are sent via the encrypted IPSec tunnel by having one of the ends or both of the IPSec tunnel sending specifically defined dummy packets over the tunnel, wherein the packet header of the dummy packets includes the command and a matching criteria. That means that the intermediate network nodes snoop dummy packets and match them to the predefined matching criteria. In case the intermediate network nodes detect the matching packets, an action gets triggered inside the intermediate network nodes.

Figure 2:
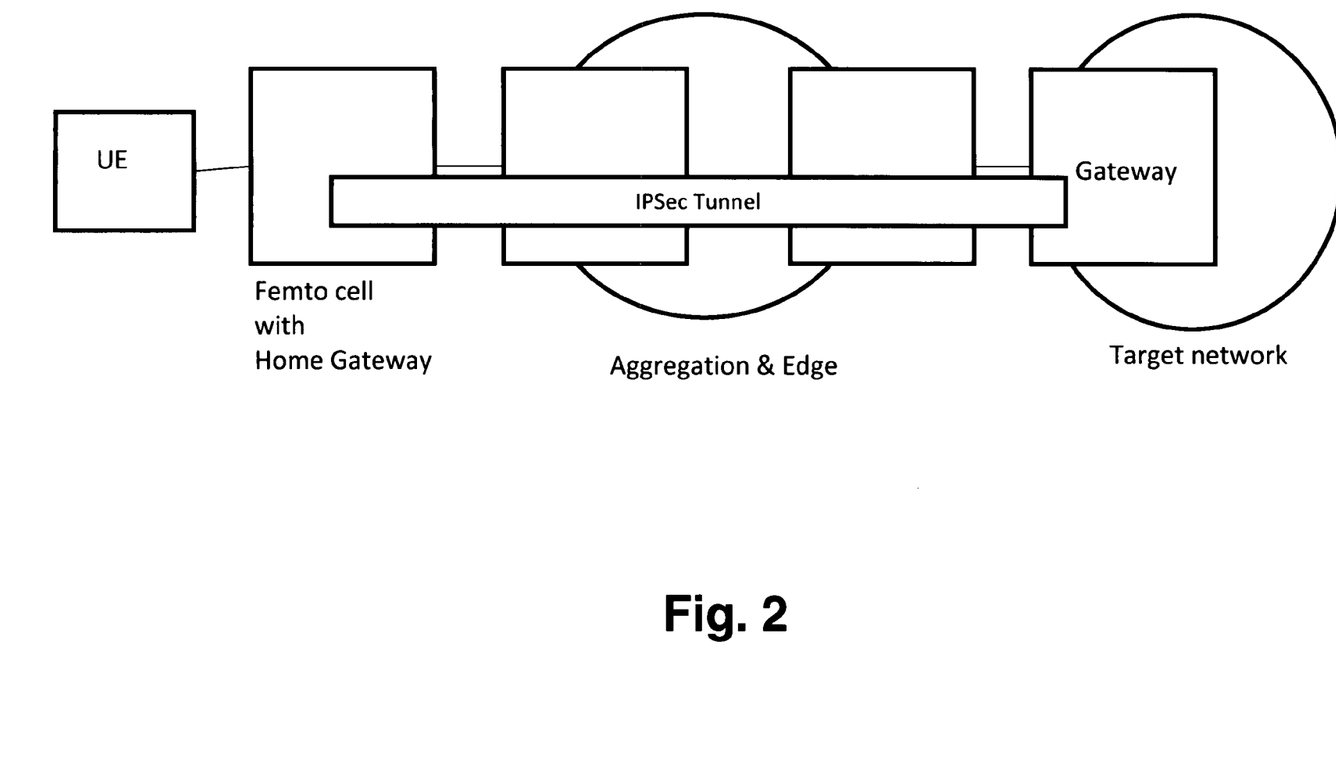
FIG. 2 is a schematic illustration of another application scenario of a method according to the present invention in the context of 3GPP access.

FIG. 2 shows another application scenario of a method according to the present invention—similar to FIG. 1—in the context of 3GPP access. According to FIG. 2 the femtocell is collocated with the Home Gateway.

Figure 3:
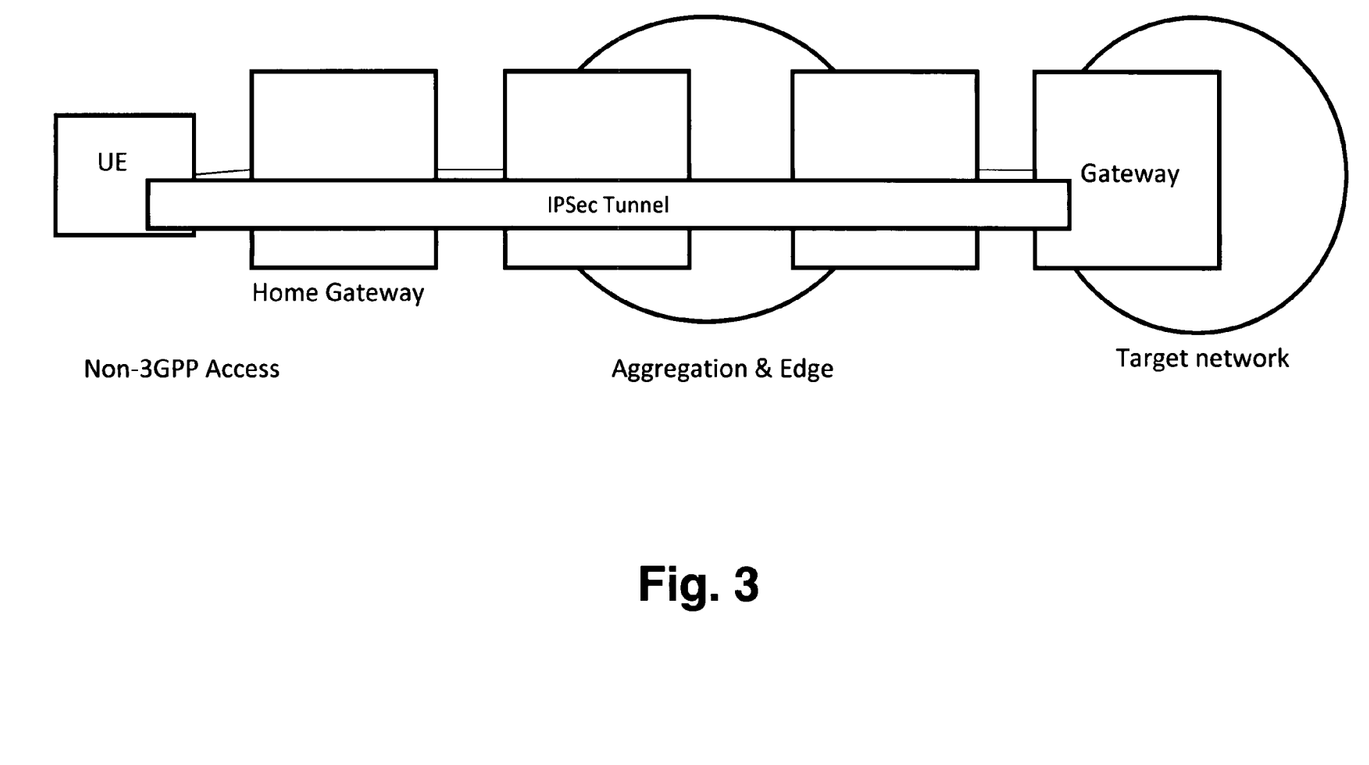
FIG. 3 is a schematic illustration of another application scenario of a method according to the present invention in the context of non-3GPP access.

FIG. 3 shows another application scenario of a method according to the present invention in the context of non-3GPP access. In case of non-3GPP access illustrated in FIG. 3 the communication device UE is connected to the target network with an IPSec tunnel. The intermediate network in the application scenario of FIG. 3 consists of the Home Gateway and the Aggregation and Edge network nodes. The Aggregation and Edge nodes can be e.g. a fixed line access network.

Figure 4:
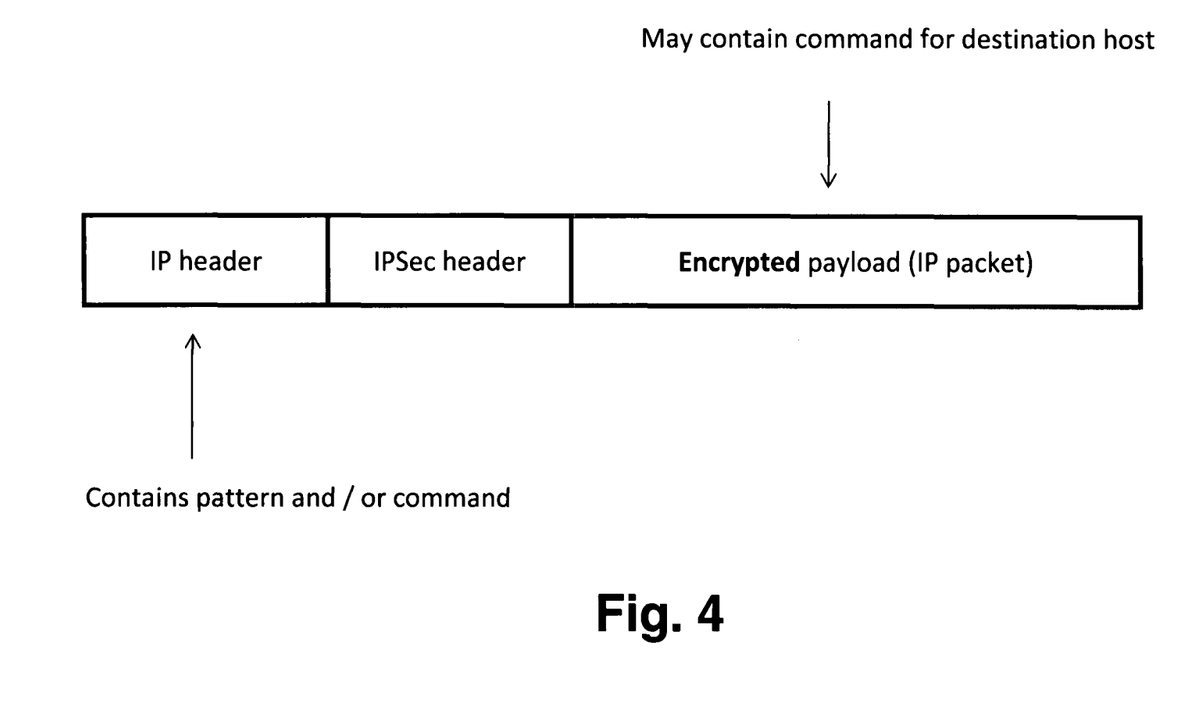
FIG. 4 is a schematic view illustrating the layout of a dummy packet.

FIG. 4 shows the layout of a dummy packet that comprises an IP header, an IPSec header and the encrypted payload of the IP packet. The IP header contains the encoded information, namely the matching criteria/pattern and/or a command for intermediate network nodes. The payload of the dummy packet can contain a command for the destination device in the target network.

Figure 5:
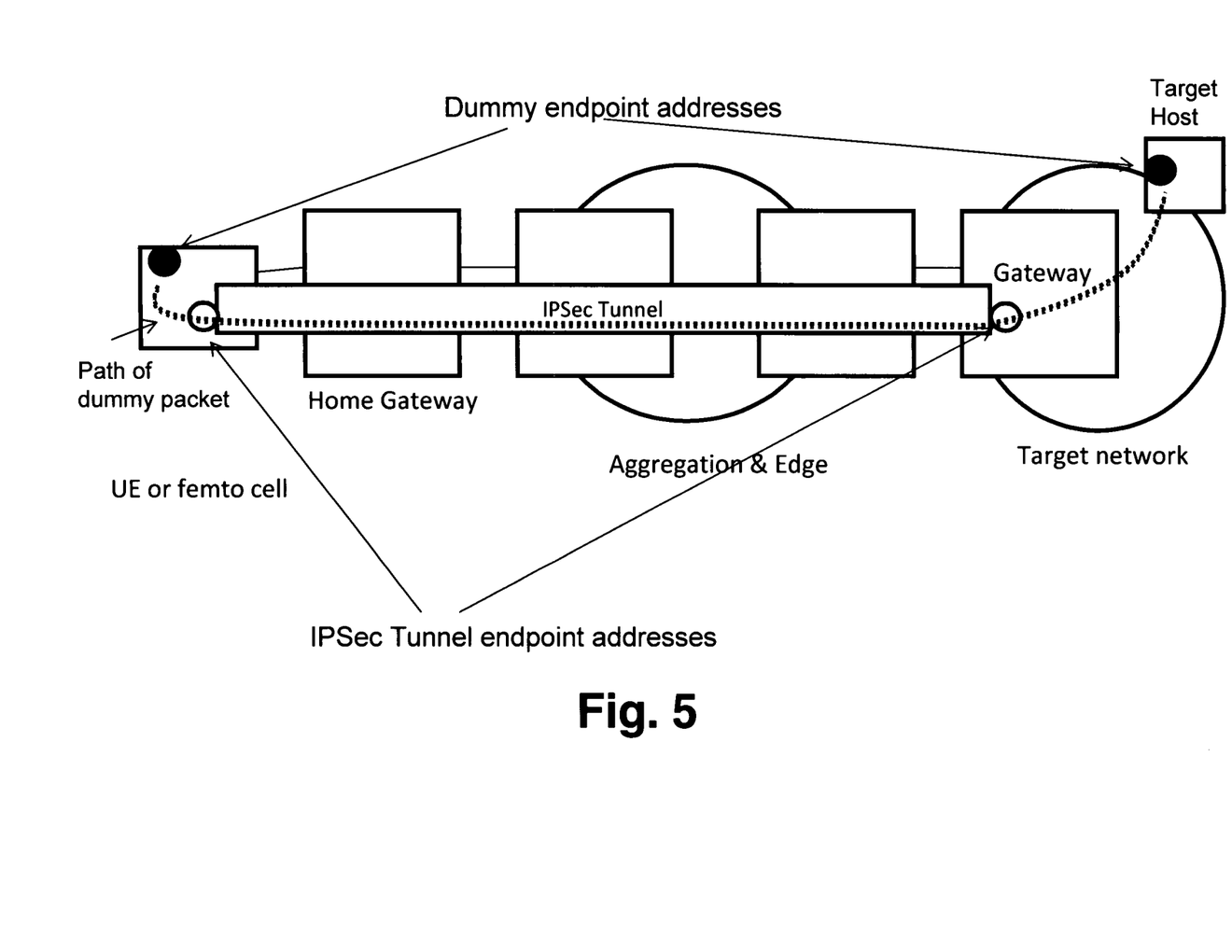
FIG. 5 is a schematic view illustrating the method in accordance with the present invention in a specific embodiment, wherein the path of a dummy packet is shown.

FIG. 5 is a schematic view illustrating the method in accordance with the present invention in a specific embodiment, wherein the path of a dummy packet is shown. Furthermore, FIG. 5 illustrates the endpoint addresses of the IPSec tunnel and endpoint addresses of the dummy packets. According to the illustrated embodiment of FIG. 5, a femtocell detects the need to set up a voice channel over the IPSec tunnel, e.g. when the communication device UE sends a Service Request message. Before allowing media to flow, the femtocell sends a set of dummy IP packets as a training sequence over the IPSec tunnel to inform the intermediate node that a command is following. The femtocell and the intermediate nodes have been pre-provisioned with the sequence that triggers an action. An example for such a sequence may be three dummy IP packets with the following characteristics:

| Number | Length | TTL |
|--------|--------|-----|
| #1     | 41     | 13  |
| #2     | 789    | 13  |
| #3     | 1297   | 13  |

It is noted that the IP endpoints are both ends to the IPSec tunnel. The encapsulated IP packet inside the IPSec tunnel is directed towards a destination node in the target network behind the gateway. The total length field of the IP header contains the real length of the whole dummy packet. No headers are incorrectly filled. Moreover, it is also used the TTL field to enable intermediate network nodes to correlate packets when intermediate packets with other TTL values are sent.

The home gateway is configured to use an engine similar to an Intrusion Detection System (IDS) to trigger for a packet with length 41 which is extremely rare and therefore selected in this example as packet #1 of the training sequence and then to check for subsequent packets, which contain the coded message. The training sequence is used to reduce the probability that normal packets trigger the intermediate nodes for potentially not wanted commands.

Now, the fourth packet including a command arrives at the intermediate network node:

| Number | Length          | TTL |
|--------|-----------------|-----|
| #4     | 1 * 512 + 200 = 712 | 13  |

Intermediate nodes are configured to read the length field of this packet as follows:

The length field comprising 16 bits is split into two bytes, the lower one as value, the higher one as command. If bit 10 of the length field is set and the higher bits 11-16 are not set, the lower bits 0-9 are used as value for a bandwidth reservation in kbps. Any intermediate node with this capability and policy will now assign a bandwidth reservation and appropriate scheduling rules for the multimedia session that is expected to happen soon.

Figure 6:
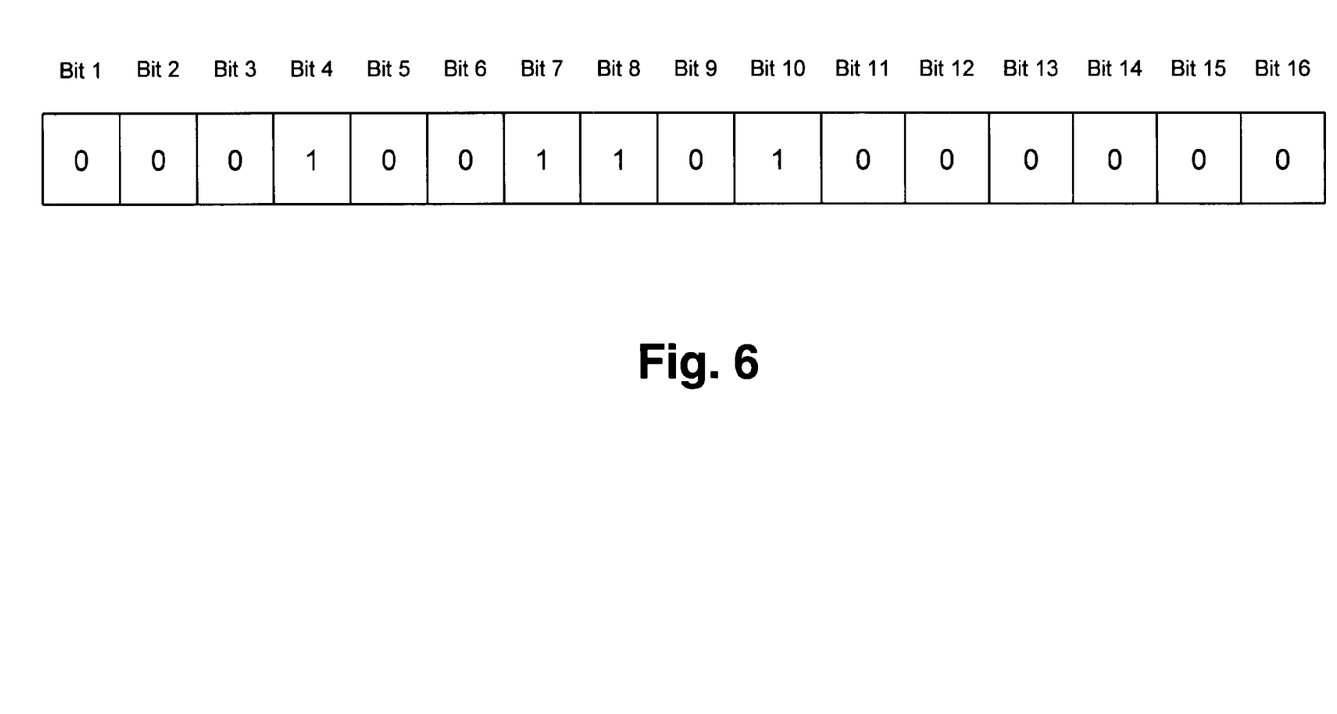
FIG. 6 is a schematic view showing the total length field of a packet header employed in an application scenario of a method according to the present invention.

FIG. 6 shows the total length field of a packet header with an exemplary command of 200 kbps as bandwidth reservation.

At session release, the femtocell sends a similar training sequence with a follow up packet indicating that the bandwidth granted before can be released now. This can be indicated in the opposite way, i.e. in case bit 10 and the higher bits 11-16 are not set, the lower bits 0-9 are used as value for the bandwidth degradation in kbps.

In case that an intermediate node is not able to reserve the requested bandwidth requested in the dummy packet, the dummy packet containing the request is discarded. The target host will recognize the missing command packet and after a time out, the target host sends a packet to the communication device UE or femtocell that can be interpreted there as a negative response. The communication device UE or femtocell may retry the resource reservation, since the packet could be lost due to other reasons.

Another possibility may be that the intermediate network node generates a new packet towards the target host, indicating that it cannot provide the requested bandwidth. The target host will send a packet back to the communication device UE or femtocell that can be interpreted there as a negative response.

Many modifications and other embodiments of the invention set forth herein will come to mind the one skilled in the art to which the invention pertains having the benefit of the teachings presented in the foregoing description and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A method for supporting a connection between a communication device and a destination device in a target network over intermediate network nodes in the context of Internet Protocol (IP) based communication,
   wherein data between said communication device and said destination device is transmitted via a tunnel,
   wherein said tunnel is established between said communication device or a base station, to which said communication device is connected, as a first tunnel endpoint and a gateway in said target network as a second tunnel endpoint,
   wherein one or more dummy packets are sent via said tunnel from said first tunnel endpoint towards said second tunnel endpoint,
   wherein information is encoded in the packet headers of said one or more dummy packets,
   wherein at least one of said intermediate network nodes, upon receiving said one or more dummy packets, performs the steps of detecting and/or decoding said encoded information and performing a predefined action dependent on said encoded information, and
   wherein said information encoded in said packet headers include predefined matching criteria in order to be detected and/or decoded by said intermediate network nodes.

2. The method according to claim 1, wherein a packet header field or a combination of packet header fields of said dummy packets are employed in order to carry said information.

3. The method according to claim 1, wherein said information is encoded in a length field of said packet headers.

4. The method according to claim 1, wherein said information is encoded in the TTL (Time to Live) field or the Hop Limit field of said packet headers.

5. The method according to claim 1, wherein said information encoded in said packet headers include a network policy and/or a command that triggers a predefined action.

6. The method according to claim 1, wherein said matching criteria include a predefined sequence of dummy packets.

7. The method according to claims 1, wherein said matching criteria are employed as one-time matching criteria.

8. The method according to claim 1, wherein said matching criteria are previously distributed to said intermediate network nodes.

9. The method according to claim 1, wherein said packet headers, in which said information is encoded, are outer Internet Protocol (IP) headers of a protocol over Internet Protocol (IP) tunnelling.

10. The method according to claim 1, wherein said dummy packets are sent via said second tunnel endpoint to said destination device, wherein payload is included in said dummy packets that is extracted by said destination device.

11. The method according to claim 1, wherein said dummy packets are sent via said second tunnel endpoint to said destination device, wherein said destination device performs an action that is based on said dummy packets upon receiving them.

12. The method according to claim 1, wherein a bidirectional communication is provided, wherein said destination device, upon receiving a dummy packet, sends a reply packet to said first tunnel endpoint.

13. A communication device being configured to execute a method according to claim 1.

14. A network node functioning as intermediate network node and being configured to execute a method according to claim 1.

15. The method according to claim 2, wherein said information is encoded in a length field of said packet headers.

16. The method according to claims 6, wherein said matching criteria are employed as one-time matching criteria.

17. The method according to claim 9, wherein the Internet Protocol (IP) tunnelling is any of Internet Protocol Security (IPSec), Generic Routing Encapsulation (GRE), Layer 2 Tunnelling Protocol (L2TP) or GPRS Tunnelling Protocol (GTP).

18. A base station for supporting a connection between a connected communication device and a destination device in a target network over intermediate network nodes,
   the base station as a first tunnel endpoint being configured to establish a tunnel with a gateway in said target network as a second tunnel endpoint for transmitting data between said communication device and said destination device,
   wherein said base station is further configured to send one or more dummy packets via said tunnel towards said gateway,
   wherein information is encoded in the packet headers of said one or more dummy packets,
   wherein said information triggers a predefined action that is performed by at least one intermediate network node between said tunnel endpoints that receives said one or more dummy packets, and
   wherein said information encoded in said packet headers include predefined matching criteria in order to be detected and/or decoded by said intermediate network nodes.

19. A method for supporting a connection between a communication device and a destination device in a target network over intermediate network nodes in the context of Internet Protocol (IP) based communication,
   wherein data between said communication device and said destination device is transmitted via a tunnel,
   wherein said tunnel is established between said communication device or a base station, to which said communication device is connected, as a first tunnel endpoint and a gateway in said target network as a second tunnel endpoint,
   wherein one or more dummy packets are sent via said tunnel from said first tunnel endpoint towards said second tunnel endpoint,
   wherein information is encoded in the packet headers of said one or more dummy packets,
   wherein at least one of said intermediate network nodes, upon receiving said one or more dummy packets, performs the steps of detecting and/or decoding said encoded information and performing a predefined action dependent on said encoded information, wherein said dummy packets are sent via said second tunnel endpoint to said destination device, and wherein said destination device performs an action that is based on said dummy packets upon receiving them.

* * * * *